United States Patent
Nakamura

[11] 4,154,508
[45] May 15, 1979

[54] REAR CONVERSION LENS

[75] Inventor: Soichi Nakamura, Kamakura, Japan

[73] Assignee: Nippon Kogaku K. K., Tokyo, Japan

[21] Appl. No.: 773,796

[22] Filed: Mar. 2, 1977

[30] Foreign Application Priority Data

Mar. 11, 1976 [JP] Japan .................................. 51-25571

[51] Int. Cl.² ........................ G02B 15/12; G02B 9/64
[52] U.S. Cl. ................................... 350/183; 350/176;
350/214; 350/215; 350/216; 350/220
[58] Field of Search ............... 350/214, 215, 216, 176,
350/183, 230, 220

[56] References Cited

U.S. PATENT DOCUMENTS

| 2,827,835 | 3/1958 | Schude .................................. 350/176 |
| 3,848,969 | 11/1974 | Tajima ............................... 350/176 X |
| 3,877,796 | 4/1975 | Yabe et al. ............................ 350/215 |

FOREIGN PATENT DOCUMENTS

1268507  6/1961  France ..................................... 350/215

*Primary Examiner*—Paul A. Sacher
*Attorney, Agent, or Firm*—Shapiro and Shapiro

[57] ABSTRACT

A rear conversion lens system to be mounted on the image side of a photographic lens to enlarge the total focal length of the entire lens system including the photographic lens comprises a diverging group and a converging group disposed on the image side of the diverging group. The diverging group includes, as viewed in order from the object side, a first positive lens component, a negative lens component and a second positive lens component. The converging group includes, as viewed in order from the object side, a positive lens component and a negative lens component.

23 Claims, 26 Drawing Figures

FIG. 13 SPHERICAL ABERRATION    ASTIGMATISM    DISTORTION

SPHERICAL ABERRATION — F4, -1.0 to 1.0
ASTIGMATISM — 12°, -1.0 to 1.0
DISTORTION — 12°, -5% to 5%

SPHERICAL ABERRATION
F4

ASTIGMATISM
12°

DISTORTION
12°

REAR CONVERSION LENS

BACKGROUND OF THE INVENTION

1. Field of the Invention

This invention relates to an attachment lens which may be mounted on the image side of a photographic lens to enlarge the focal length thereof, or a so-called rear conversion lens.

2. Description of the Prior Art

An attachment lens of this type which has heretofore been commercially available provides a negative lens system having a strong power and therefore, the Petzval sum thereof becomes negative, as a result of which the astigmatic difference between the sagittal plane and the meridional plane is particularly great, and accordingly, the other aberrations are also great. It may thus be said that a lens system having a conversion lens of such type mounted thereto to increase the focal length of the lens system is considerably inferior in performance to a fixed lens having a focal length equivalent thereto.

SUMMARY OF THE INVENTION

The present invention has, for its object, to provide a high performance rear conversion lens which comprises two lens groups, namely, a diverging lens group and a converging lens group, the diverging lens group basically consisting of three separate components, positive, negative and positive, and the converging lens group basically consisting of two separate components, positive and negative.

In accordance with a basic embodiment of the present invention, the rear conversion lens system to be mounted on the image side of a photographic lens to enlarge the total focal length of the entire lens system including the photographic lens comprises a diverging group and a converging group disposed on the image side of the diverging group, the diverging group including, as viewed in order from the object side, a first positive lens component, a negative lens component and a second positive lens component, the converging group including, as viewed in order from the object side, a positive lens component and a negative lens component.

The invention will become more fully apparent from the following detailed description thereof taken in conjunction with the accompanying drawings.

DESCRIPTION OF THE PREFERRED EMBODIMENTS

Figure 25:
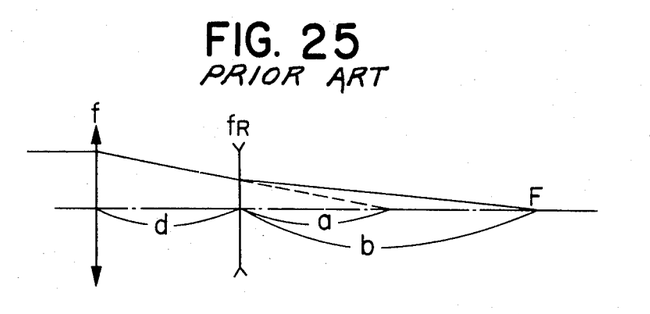
FIG. 25 illustrates the principle of the usual rear converter.

The principle of the usual rear conversion lens will first be described by reference to FIG. 25. In FIG. 25, let f be the focal length of the fixed focal length lens which provides a reference, fR the focal length of the rear conversion lens, d the distance between the principal planes of the two lenses, F the back focus of the composite lens system provided by the standard lens and the conversion lens, and b the distance from the back principal plane of the rear conversion lens to the back focus F, and assume that $a = f - d$. Then, $$1/-a + 1/b = 1/fR \tag{1}$$

The lateral magnification $\beta$ of the rear conversion lens is:

$$\beta = b/a$$

and the total focal length F is expressed as:

$$F = f \cdot \beta$$

When the rear conversion lens in which $\beta$ is constant is considered, a greatest possible value for a leads to a greater value b and as the result, the fR can be increased according to equation (1), so that the negative Petzval sum does not have to be increased. However, when various interchangeable lenses for a single lens reflex camera are considered, those lenses whose focal lengths are short are necessarily short in back focal length and the telephoto lenses are not so long in back focal length and thus, a is unavoidably small and accordingly, fR is also small, so that it is very difficult to correct the Petzval sum.

According to the present invention, this rear conversion fR is made into a two-group type to thereby decrease the Petzval sum in terms of power arrangement and the distance between the principal planes of the respective lens groups is decreased to increase the freedom of correction of the aberrations, thereby realizing a high performance rear conversion.

Figure 26:
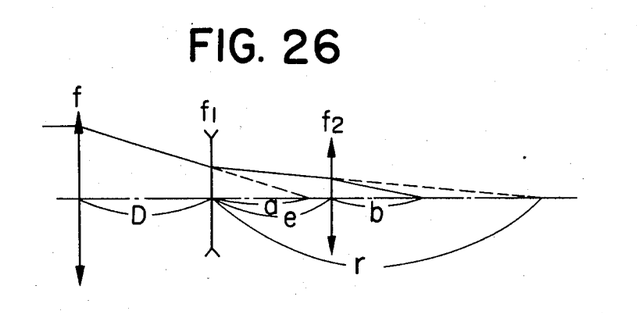
FIG. 26 illustrates the principle of the present invention.

The principle of the rear conversion lens according to the present invention will hereinafter be described by reference to FIG. 26.

Let $f_1$ and $f_2$ be the focal lengths of the diverging lens group and the converging lens group respectively assuming that both lens groups are thin lenses, e the distance between the principal planes of the two groups, a the length as measured from the principal plane of the diverging lens group to the back focus of the standard lens, b the length as measured from the principal plane of the converging lens group to the final image point of the composite lens system, and r the length as measured from the principal plane of the diverging lens group to the image point provided by the diverging lens group. Then, $$1/-a + 1/r = 1/f_1 \tag{2}$$

$$1/(-r+e) + 1/b = 1/f_2 \tag{3}$$

Assuming that the focal length of the entire rear conversion lens is fR, $$1/fR = 1/f_1 + 1/f_2 - e/f_1 f_2$$

Also, the magnification $\beta$ of the entire rear conversion lens is expressed as:

$$\beta = \{r/a\} \cdot \{b/(r-e)\} \tag{4}$$

If the diverging and the converging lens groups of the rear conversion lens respectively comprise k single lenses and h single lenses, $$1/f_1 N_D = \sum_{i=1}^{k} 1/q_i n_i$$

and $$1/f_2 N_C = \sum_{j=1}^{h} 1/q_j n_j$$

where $N_D$ and $N_C$ represent the equivalent refractive indices of the respective groups when they are each regarded as a single lens, $q_i$ and $q_j$ represent the focal lengths of the respective components, and $n_i$ and $n_j$ represent the refractive indices of the respective components.

Assuming that the Petzval sum of the entire rear conversion lens is P, $$P = 1/f_1 N_D + 1/f_C N_2 \qquad (5)$$

By equations (2), (3), (4) and (5), the following is given:

$$r = \frac{a(a\beta N_D - bN_C)}{aN_D - bN_C - abPN_D N_C} \qquad (6)$$

Also, from equation (2), $$f_1 = ra/(a-r) \qquad (7)$$

From equation (4), $$e = r - br/\beta a \qquad (8)$$

From equations (3) and (4), $$f_2 = rb/(r - a\beta) \qquad (9)$$

Therefore, if a, b, P, $N_D$, $N_C$ and $\beta$ and given, r can be determined by equation (6) and $f_1$, $f_2$ and e can be determined by equations (7), (8) and (9). Thus, the skeleton of such optical system, namely, $f_1$, $f_2$ and e, are determined by the value of the Petzval sum P required for such type of rear conversion lens, how the equivalent refractive index $N_D$ of the diverging group can be made and how low the equivalent index $N_C$ of the converging group can be made without involving aggravated aberrations.

By realizing the following relations;
$1.5 < N_D < 2.9$ and
$0.6 < N_C < 1.3$,
a rear conversion lens in accordance with the invention is attained which has very well balanced aberrations.

Further, the fact that the present lens system is of the two-group type requires achromatization of the forward i.e. diverging and the rearward i.e. converging group to be accomplished, and assuming that the refractive index and Abbe number of the positive lens component forming the forward group are nDP and νVP, respectively, and that those of the positive lens component forming the forward group and nDN and νDN, respectively, they must be in the following relations:
   nDP < nDN and
   νDP < νDN.
Assuming that the refractive index and the Abbe number of the positive lens component forming the rear group are nCP and νCP, respectively, and that those of the negative lens component forming the rear group are nCN and νCN, respectively, they must be in the following relations:
   nCP < nCN and
   νCP < νCN.

Some embodiments of the present invention will now be described in detail.

Figure 1:
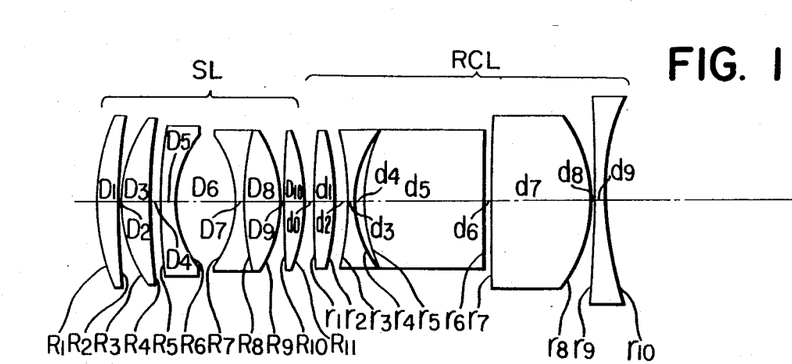
FIGS. 1 to 12 are cross-sectional views of optical systems in which a standard lens is attached to the lens systems according to Embodiments 1 to 12 of the present invention.

FIG. 1 shows the lens arrangement when the rear conversion lens RCL according to a first embodiment of the present invention is mounted to a standard lens SL having a focal length f=51.6 and a F-number 2.0.

Embodiment 1 is a basic one of the present invention, in which the forward group comprises three components, positive, negative and positive, and $N_D = 1.75$, while the rearward group comprises two positive and negative components and $N_C = 0.921$ is realized, thereby enabling the provision of a rear conversion lens in which the Petzval sum is −0.0061.

| $f_1 = -50.48869$, | $f_2 = 208.1101$, |
|---|---|
| e = 20.25835, | fR = −76.492. |

Figure 2:
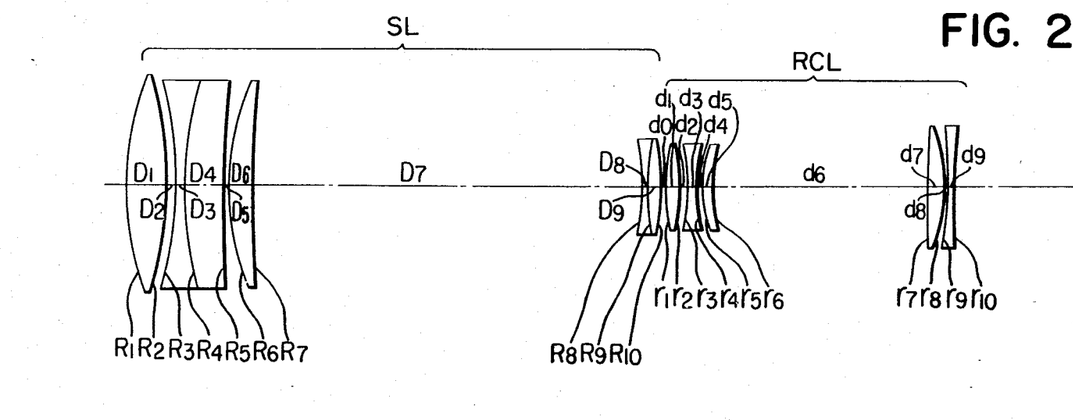

FIG. 2 shows the lens arrangement when the rear conversion lens RCL according to a second embodiment of the present invention is mounted to a standard lens SL having a focal length f=300 mm and a F-number 4.5.

Embodiment 2 has the following numerical values:

| $f_1 = -96.8024$, | $f_2 = 281.131$ |
|---|---|
| e = 69.217, | |
| $N_D = 1.906$ | $N_C = 1.1292$, |
| fR = −236.415 | p = −0.00227. |

Figure 3:
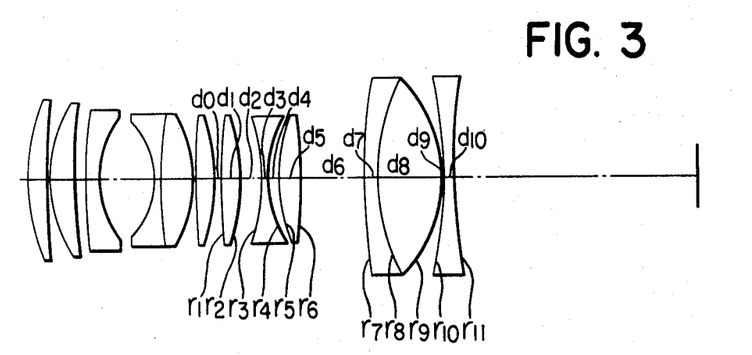

In Embodiment (3) shown in FIG. 3, which is substantially similar in construction to Embodiment 1, the positive component of the rearward group is provided by a negative and a positive element cemented together, thereby intending to improve the Petzval sum. In this embodiment,

| $N_D = 1.664$, | $N_C = 0.7664$, |
|---|---|
| P = −0.00563. | |

Figure 4:
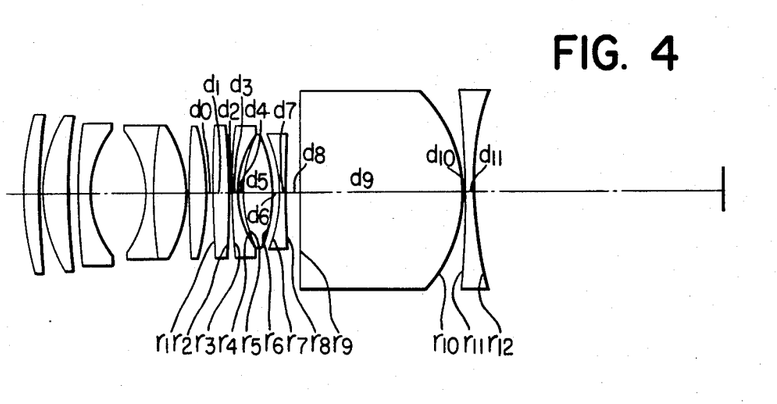

In Embodiment 4 shown in FIG. 4, which is again substantially similar in construction to Embodiment 1, the second positive component of the forward group is divided into two components, positive and negative, so that the forward group is provided by four components, positive, negative, positive and negative. By this, $N_D = 2.311$ and $N_C = 0.953$ can be realized and the Petzval sum P can be reduced to P=0.0035.

Figure 5:
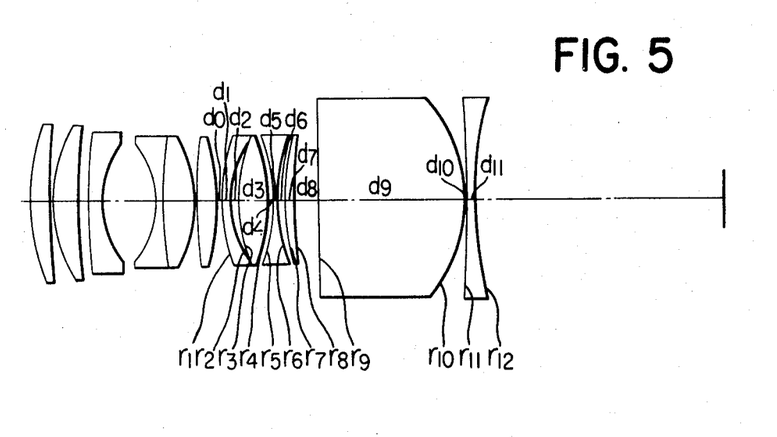

In Embodiment 5 shown in FIG. 5, which is also substantially similar in construction to Embodiment 1, the first positive component of the forward group is divided into two components, negative and positive, so that the forward group is provided by four components, negative, positive, negative and positive. By this, $N_D = 2.23$ and $N_C = 0.965$ can be realized and the Petzval sum P can be reduced to P=−0.00389.

Figure 6:
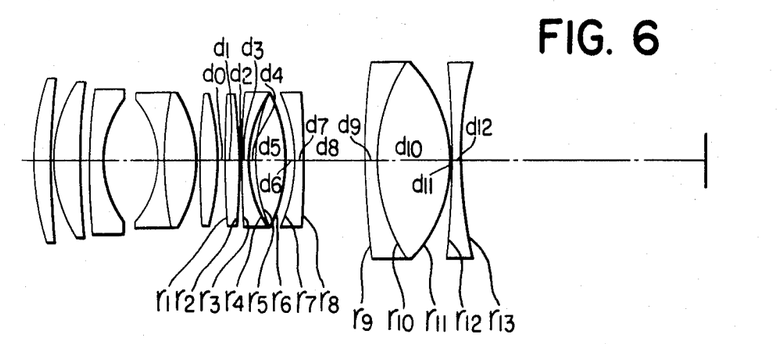

In Embodiment 6 shown in FIG. 6, which is substantially similar in construction to Embodiment 4, the positive component of the rearward group is provided by a negative and a positive component cemented together to thereby further reduce the Petzval sum. In this embodiment,

| | |
|---|---|
| $N_D = 2.295$, | $N_C = 0.7183$, |
| $P = -0.00194$. | |

Figure 7:
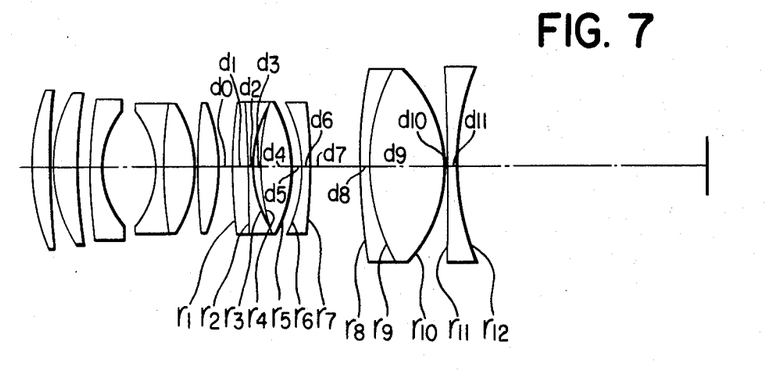

In embodiment 7 shown in FIG. 7, which is substantially similar in construction to Embodiment 6, the first positive and the first negative component of the forward group are cemented together and

| | |
|---|---|
| $N_D = 2.179$, | $N_C = 0.679$, |
| $P = -0.00201$. | |

Figure 8:
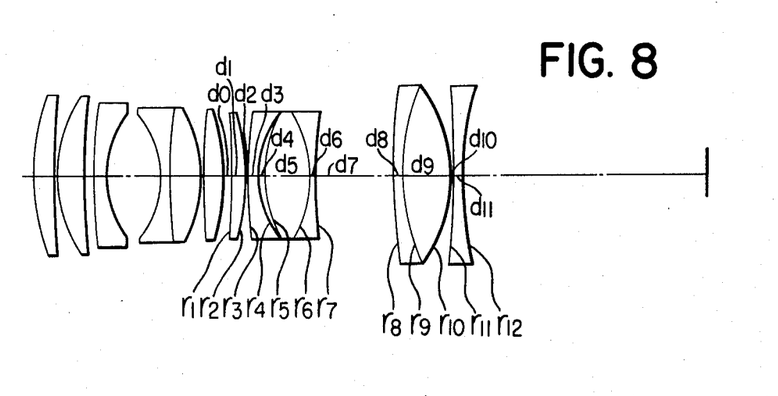

In Embodiment 8 shown in FIG. 8, which is substantially similar in construction to Embodiment 6, the second positive and the second negative component of the forward group are cemented together, thereby succeeding in realizing:

| | |
|---|---|
| $N_D = 2.7395$, | $N_C = 0.7555$, |
| $P = -0.0009$. | |

Figure 9:
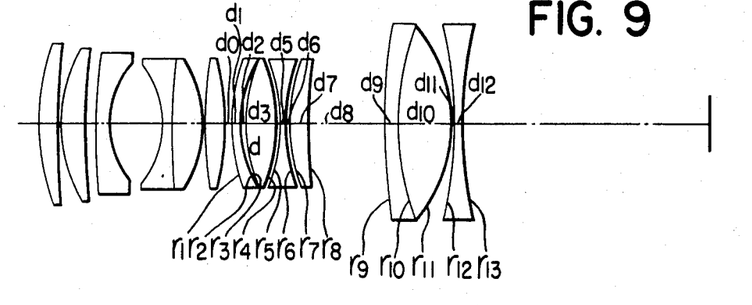

In Embodiment 9 shown in FIG. 9, which is substantially similar in construction to Embodiment 5, the positive component of the rearward group is provided by a negative and a positive component cemented together, thereby reducing the Petzval sum. In this embodiment,

| | |
|---|---|
| $N_D = 2.3058$ | $N_C = 0.7676$ |
| $P = -0.00232$. | |

Figure 10:
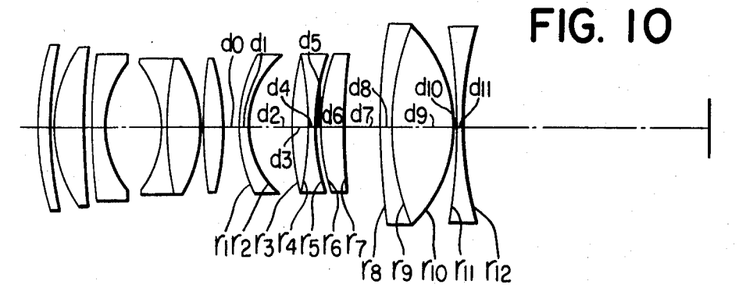

In Embodiment 10 shown in FIG. 10, which is substantially similar in construction to Embodiment 9, the first positive and the second negative component of the forward group are cemented together, thereby realizing:

| | |
|---|---|
| $N_D = 2.16$, | $N_C = 0.7652$, |
| $p = -0.00289$. | |

Figure 11:
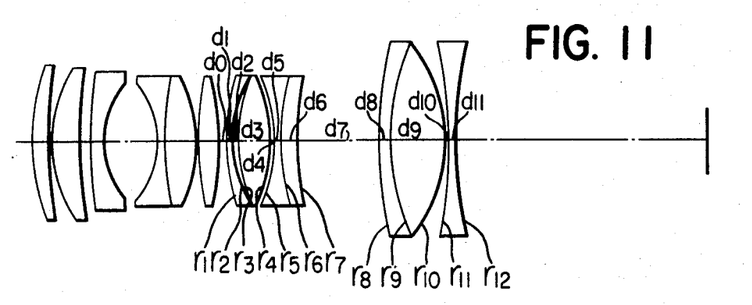

In Embodiment 11 shown in FIG. 11, which is substantially similar in construction to Embodiment 9, the second negative and the second positive component of the forward group are cemented together, thereby realizing:

| | |
|---|---|
| $N_D = 2.369$, | $N_C = 0.7701$, |
| $P = -0.00211$. | |

Figure 12:
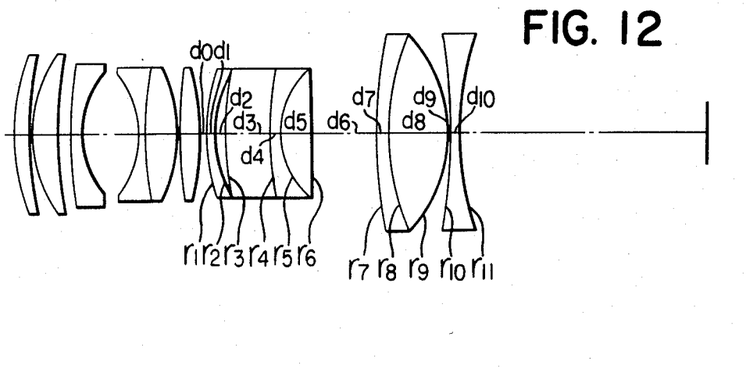
Figure 13:
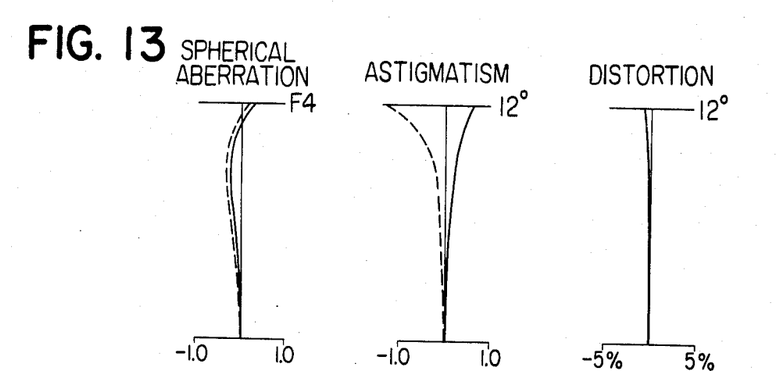
FIGS. 13 to 24 illustrate various aberrations in the optical systems in which a standard lens is attached to the lens systems according to Embodiments 1 to 12 of the present invention.
Figure 14:
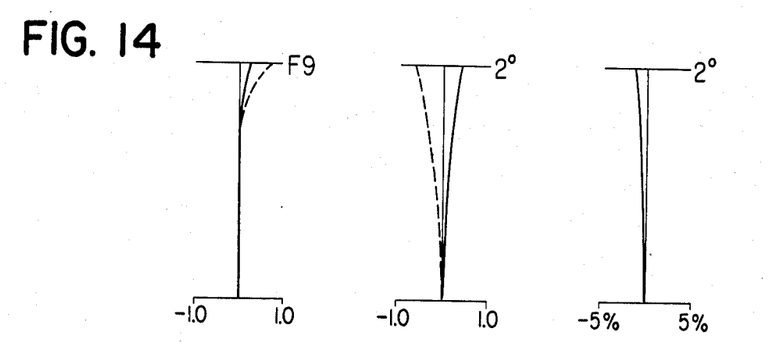
Figure 15:
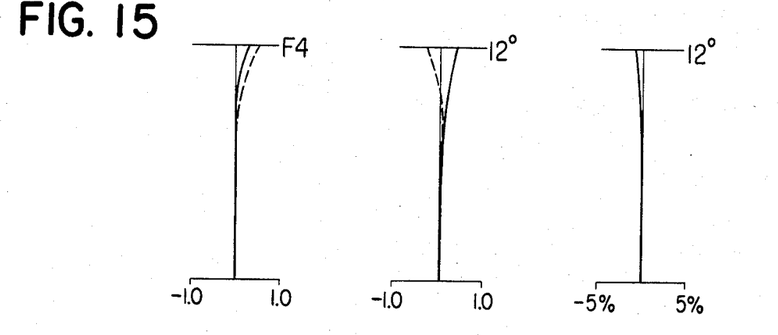
Figure 16:
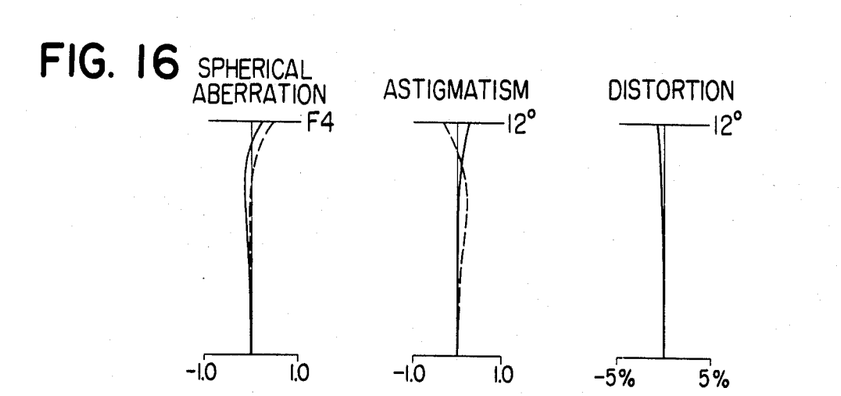
Figure 17:
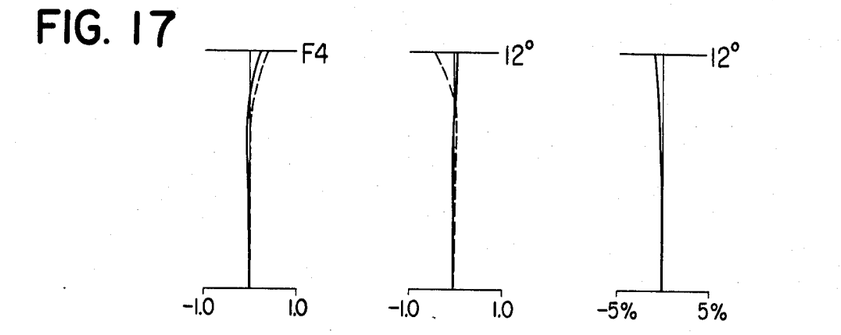
Figure 18:
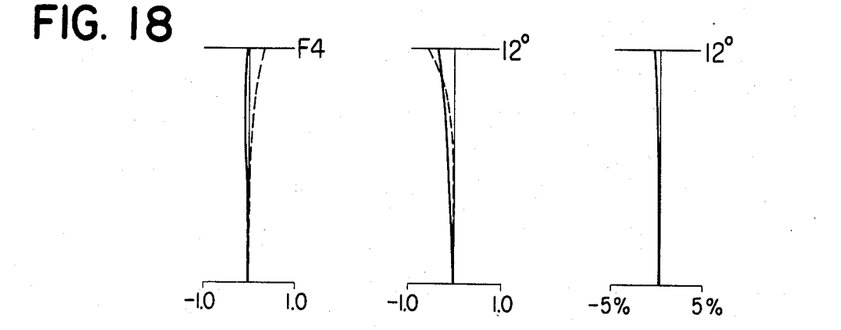
Figure 19:
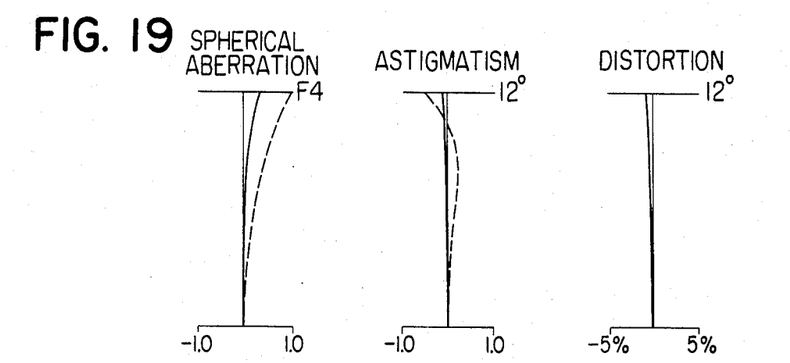
Figure 20:
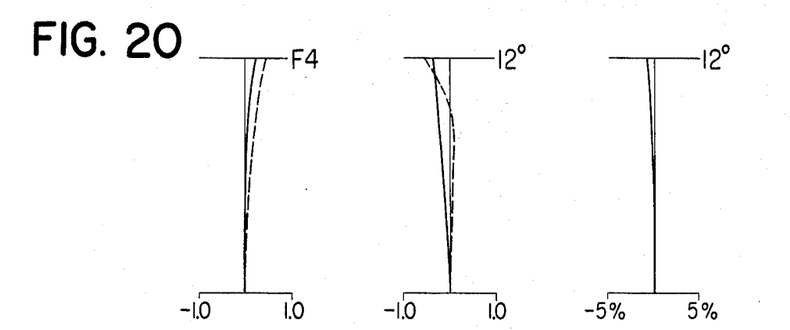
Figure 21:
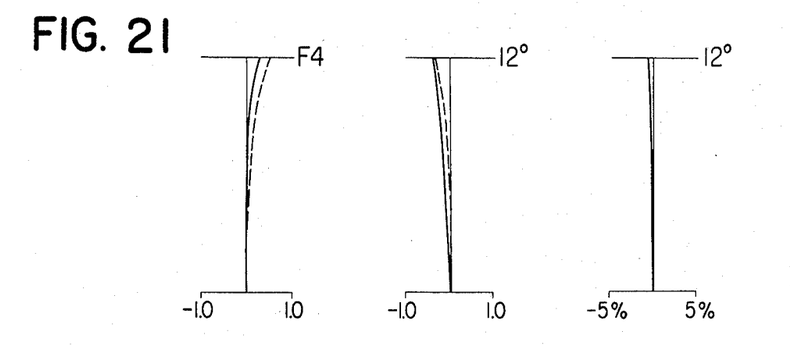
Figure 22:
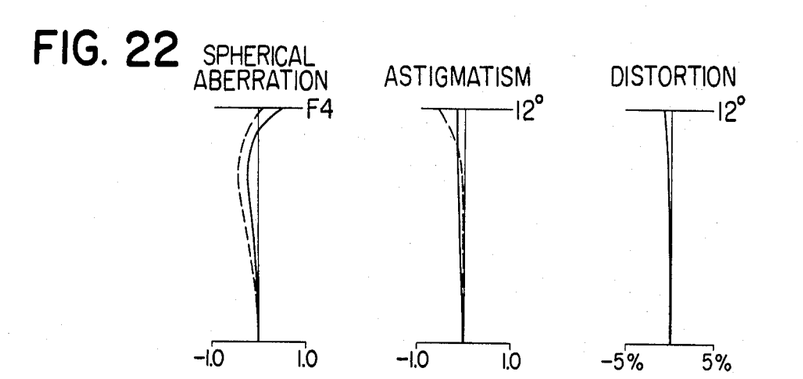
Figure 23:
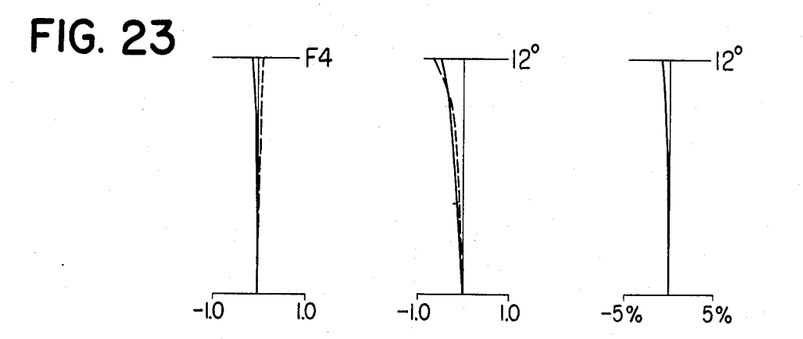
Figure 24:
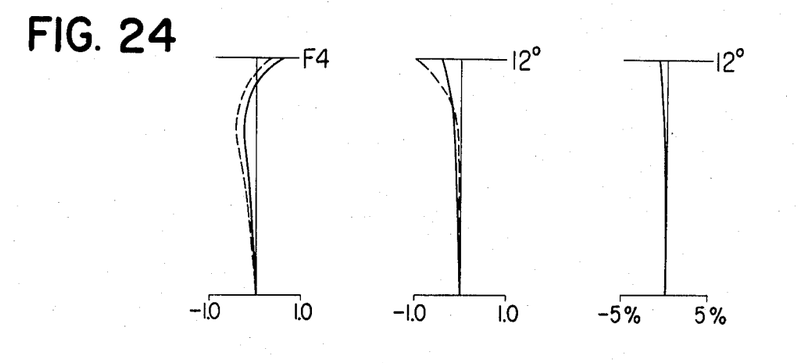

In Embodiment 12 shown in FIG. 12, which is again similar in construction to Embodiment 9, the first positive, the second negative and the second positive component of the first group are cemented together, thereby realizing:

| | |
|---|---|
| $N_D = 2.427$, | $N_C = 0.8214$, |
| $P = -0.00231$. | |

Now, the numerical data of the various embodiments of the present invention will be shown below, but before that, examples will first be shown of the typical Gauss type standard lens to which is to be mounted the rear conversion lens of the present invention used in any of Embodiment 1 and Embodiments 3 to 12, and of the typical telephoto lens to which is to be mounted the rear conversion lens used in Embodiment 2.

In the tables below, $R_1$, $R_2$ and so on represent the radii of the successive lens surfaces as viewed from the object side, $D_1$, $D_2$ and so on represent the thickness of, or the distances between, the successive lens surfaces as viewed from the object side, and $N_1$, $N_2$ and so on and $\nu_1$, $\nu_2$ and so on represent the refractive indices and the Abbe numbers, respectively, of the successive lenses.

The standard lens used in any of Embodiment 1 and Embodiments 3 to 12 has the following data:

| $f = 51.6$ | F2 | Angle of view $2\omega = 46°$ | |
|---|---|---|---|
| $R_1 = 36.011$ | $D_1 = 3.41$ | $N_1 = 1.62299$ | $V_1 = 58.1$ |
| $R_2 = 114.87$ | $D_2\, 0.11$ | | |
| $R_3 = 22.46$ | $D_3 = 4.55$ | $N_2\, 1.6779$ | $V_2 = 55.5$ |
| $R_4 = 81.84$ | $D_4 = 1.84$ | | |
| $R_5 = 102.18$ | $D_5 = 1.98$ | $N_3 = 1.62588$ | $V_3 = 35.6$ |
| $R_6 = 14.954$ | $D_6 = 9.4$ | | |
| $R_7 = -16.1$ | $D_7 = 1.18$ | $N_4 = 1.62606$ | $V_4 = 39.1$ |
| $R_8 = 69.04$ | $D_8 = 5.91$ | $N_5 = 1.63854$ | $V_5 = 55.5$ |
| $R_9 = -21.13$ | $D_9 = 0.11$ | | |
| $R_{10} = 114.52$ | $D_{10} = 3.33$ | $N_6\, 1.63854$ | $V_6 = 55.5$ |
| $R_{11} = -43.546$ | | | |

The standard lens used in Embodiment 2:

| $f = 300$ | F4.5 | Angle of view $2\omega = 8°\, 10'$ | |
|---|---|---|---|
| $R_1 = 106.0$ | $D_1 = 11.0$ | $N_1 = 1.48606$ | $V_1 = 81.9$ |
| $R_2 = -151.0$ | $D_2 = 4.0$ | | |
| $R_3 = -144.0$ | $D_3 = 3.0$ | $N_2 = 1.744$ | $V_2 = 44.9$ |
| $R_4 = 130.0$ | $D_4\, 12.0$ | $N_3 = 1.6393$ | $V_3 = 45.0$ |
| $R_5 = 650.0$ | $D_5\, 1.0$ | | |
| $R_6 = 95.0$ | $D_6 = 7.7$ | $N_4 = 1.48606$ | $V_4 = 81.9$ |
| $R_7\, 878.8$ | $D_7 = 119.3$ | | |
| $R_8 = -43.0$ | $D_8 = 1.0$ | $N_5 = 1.62041$ | $V_5 = 60.3$ |
| $R_9 = 150.0$ | $D_9 = 3.5$ | $N_6 = 1.62004$ | $V_6 = 36.3$ |
| $R_{10} = -104.82$ | | | |

Examples of the rear conversion lens will be shown below. The total focal length of the rear conversion lens when mounted to the above-shown standard lens is $f=103.2$ F4 and $2\omega=24.4°$ in any of Embodiment 1 and Embodiments 3 to 12, and is $f=600$, F9 and $2\omega=4°10'$, that is, the magnification of the rear conversion is $\beta=2$ in all of the embodiments.

In the tables below, r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, and the subscript numbers represent the order from the object side.

EXAMPLE 1

| | | $d_0 = 0.7613$ | | |
|---|---|---|---|---|
| | $r_1 = 84.84$ | $d_1 = 3.0$ | $n_1 = 1.59507$ | $\nu_1 = 35.6$ |
| | $r_2 = -67.022$ | $d_2 = 2.3$ | | |
| | $r_3 = -65.251$ | $d_3 = 1.0$ | $n_2 = 1.74443$ | $\nu_2 = 49.4$ |
| $f_1$ | $r_4 = 16.493$ | $d_4 = 1.4$ | | |
| | $r_5 = 35.215$ | $d_5 = 18.9$ | $n_3 = 1.59507$ | $\nu_3 = 35.6$ |
| | $r_6 = -658.806$ | $d_6 = 0.514$ | | |
| | $r_7 = 877.266$ | $d_7 = 1.2$ | $n_4 = 1.50137$ | $\nu_4 = 56.5$ |
| | $r_8 = -21.399$ | $d_8 = 0.1$ | | |
| $f_2$ | $r_9 = -332.183$ | $d_9 = 1.0$ | $n_5 = 1.80454$ | $\nu_5 = 39.5$ |
| | $r_{10} = 47.332$ | | | |

EXAMPLE 2

|  |  | $d_0 = 1.5423$ |  |  |
|---|---|---|---|---|
| $f_1$ | $r_1 = 179.709$ | $d_1 = 3.7$ | $n_1 = 1.59507$ | $\nu_1 = 35.6$ |
|  | $r_2 = -90.827$ | $d_2 = 2.0$ |  |  |
|  | $r_3 = -109.097$ | $d_3 = 2.1$ | $n_2 = 1.74443$ | $\nu_2 = 49.4$ |
|  | $r_4 = 32.52$ | $d_4 = 2.1$ |  |  |
|  | $r_5 = 40.56$ | $d_5 = 4.2$ | $n_3 = 1.59507$ | $\nu_3 = 35.6$ |
|  | $r_6 = 99.049$ | $d_6 = 66.24$ |  |  |
| $f_2$ | $r_7 = 317.64$ | $d_7 = 6.2$ | $n_4 = 1.50137$ | $\nu_4 = 56.5$ |
|  | $r_8 = -55.266$ | $d_8 = 0.2$ |  |  |
|  | $r_9 = -195.754$ | $d_9 = 1.8$ | $n_5 = 1.80454$ | $\nu_5 = 39.5$ |
|  | $r_{10} = 267.716$ |  |  |  |

EXAMPLE 3

|  |  | $d_0 = 0.52644$ |  |  |
|---|---|---|---|---|
| $f_1$ | $r_1 = 187.587$ | $d_1 = 3.0$ | $n_1 = 1.59507$ | $\nu_1 = 35.6$ |
|  | $r_2 = -47.144$ | $d_2 = 3.3$ |  |  |
|  | $r_3 = -35.794$ | $d_3 = 1.0$ | $n_2 = 1.74443$ | $\nu_2 = 49.4$ |
|  | $r_4 = 19.353$ | $d_4 = 2.3$ |  |  |
|  | $r_5 = 44.11$ | $d_5 = 3.4$ | $n_3 = 1.59507$ | $\nu_3 = 35.6$ |
|  | $r_6 = -110.232$ | $d_6 = 11.275$ |  |  |
| $f_2$ | $r_7 = 114.19$ | $d_7 = 2.0$ | $n_4 = 1.6968$ | $\nu_4 = 55.6$ |
|  | $r_8 = 34.505$ | $d_8 = 11.1$ | $n_5 = 1.50137$ | $\nu_5 = 56.5$ |
|  | $r_9 = -21.903$ | $d_9 = 0.1$ |  |  |
|  | $r_{10} = -92.338$ | $d_{10} = 1.4$ | $n_6 = 1.80454$ | $\nu_6 = 39.5$ |
|  | $r_{11} = 80.765$ |  |  |  |

EXAMPLE 4

|  |  | $d_0 = 0.8448$ |  |  |
|---|---|---|---|---|
| $f_1$ | $r_1 = 7602.182$ | $d_1 = 2.5$ | $n_1 = 1.59507$ | $\nu_1 = 35.6$ |
|  | $r_2 = -85.234$ | $d_2 = 0.1$ |  |  |
|  | $r_3 = 111.37$ | $d_3 = 1.0$ | $n_2 = 1.74443$ | $\nu_2 = 49.4$ |
|  | $r_4 = 16.963$ | $d_4 = 1.0$ |  |  |
|  | $r_5 = 27.323$ | $d_5 = 4.9$ | $n_3 = 1.59507$ | $\nu_3 = 35.6$ |
|  | $r_6 = -27.976$ | $d_6 = 1.1$ |  |  |
|  | $r_7 = -25.116$ | $d_7 = 1.0$ | $n_4 = 1.79668$ | $\nu_4 = 45.4$ |
|  | $r_8 = 439.936$ | $d_8 = 2.645$ |  |  |
| $f_2$ | $r_9 = 1743.856$ | $d_9 = 28.23$ | $n_5 = 1.50137$ | $\nu_5 = 56.5$ |
|  | $r_{10} = -22.944$ | $d_{10} = 0.1$ |  |  |
|  | $r_{11} = -294.545$ | $d_{11} = 1.0$ | $n_6 = 1.80454$ | $\nu_6 = 39.5$ |
|  | $r_{12} = 54.449$ |  |  |  |

EXAMPLE 5

|  |  | $d_0 = 0.9271$ |  |  |
|---|---|---|---|---|
| $f_1$ | $r_1 = 36.295$ | $d_1 = 1.0$ | $n_1 = 1.79668$ | $\nu_1 = 45.0$ |
|  | $r_2 = 17.706$ | $d_2 = 1.2$ |  |  |
|  | $r_3 = 32.624$ | $d_3 = 4.7$ | $n_2 = 1.59507$ | $\nu_2 = 35.6$ |
|  | $r_4 = -28.183$ | $d_4 = 1.2$ |  |  |
|  | $r_5 = -27.231$ | $d_5 = 1.0$ | $n_3 = 1.77279$ | $\nu_3 = 49.4$ |
|  | $r_6 = 55.411$ | $d_6 = 1.0$ |  |  |
|  | $r_7 = 58.841$ | $d_7 = 1.55$ | $n_4 = 1.59507$ | $\nu_4 = 35.6$ |
|  | $r_8 = 117.020$ | $d_8 = 4.12$ |  |  |
| $f_2$ | $r_9 = 1086.312$ | $d_9 = 25.3$ | $n_5 = 1.50137$ | $\nu_5 = 56.5$ |
|  | $r_{10} = -24.049$ | $d_{10} = 0.1$ |  |  |
|  | $r_{11} = -185.481$ | $d_{11} = 1.0$ | $n_6 = 1.80454$ | $\nu_6 = 39.5$ |
|  | $r_{12} = 65.497$ |  |  |  |

EXAMPLE 6

|  |  | $d_0 = 0.96135$ |  |  |
|---|---|---|---|---|
| $f_1$ | $r_1 = \infty$ | $d_1 = 2.5$ | $n_1 = 1.59507$ | $\nu_1 = 35.6$ |
|  | $r_2 = -81.319$ | $d_2 = 0.1$ |  |  |
|  | $r_3 = 401.867$ | $d_3 = 1.0$ | $n_2 = 1.74443$ | $\nu_2 = 49.4$ |
|  | $r_4 = 18.181$ | $d_4 = 1.4$ |  |  |
|  | $r_5 = 28.13$ | $d_5 = 5.3$ | $n_3 = 1.59507$ | $\nu_3 = 35.6$ |
|  | $r_6 = -24.535$ | $d_6 = 1.5$ |  |  |
|  | $r_7 = -21.934$ | $d_7 = 1.0$ | $n_4 = 1.79668$ | $\nu_4 = 45.4$ |
|  | $r_8 = -472.423$ | $d_8 = 11.728$ |  |  |
| $f_2$ | $r_9 = 88.894$ | $d_9 = 1.5$ | $n_5 = 1.79877$ | $\nu_5 = 44.3$ |
|  | $r_{10} = 33.579$ | $d_{10} = 12.6$ | $n_6 = 1.50137$ | $\nu_6 = 56.5$ |
|  | $r_{11} = -22.556$ | $d_{11} = 0.1$ |  |  |
|  | $r_{12} = -152.552$ | $d_{12} = 1.0$ | $n_7 = 1.80454$ | $\nu_7 = 39.5$ |
|  | $r_{13} = 64.571$ |  |  |  |

EXAMPLE 7

|  |  | $d_0 = 1.954$ |  |  |
|---|---|---|---|---|
| $f_1$ | $r_1 = 87.4$ | $d_1 = 2.5$ | $n_1 = 1.59507$ | $\nu_1 = 35.6$ |
|  | $r_2 = 576.216$ | $d_2 = 1.0$ | $n_2 = 1.74443$ | $\nu_2 = 49.4$ |
|  | $r_3 = 17.692$ | $d_3 = 1.4$ |  |  |
|  | $r_4 = 36.939$ | $d_4 = 5.2$ | $n_3 = 1.59507$ | $\nu_3 = 35.6$ |
|  | $r_5 = -20.532$ | $d_5 = 2.0$ |  |  |
|  | $r_6 = -19.333$ | $d_6 = 1.0$ | $n_4 = 1.79877$ | $\nu_4 = 44.3$ |
|  | $r_7 = -79.971$ | $d_7 = 8.469$ |  |  |
| $f_2$ | $r_8 = 86.861$ | $d_8 = 1.5$ | $n_5 = 1.79877$ | $\nu_5 = 44.3$ |
|  | $r_9 = 30.221$ | $d_9 = 13.9$ | $n_6 = 1.50137$ | $\nu_6 = 56.5$ |
|  | $r_{10} = -20.432$ | $d_{10} = 0.1$ |  |  |
|  | $r_{11} = -188.213$ | $d_{11} = 1.0$ | $n_7 = 1.80454$ | $\nu_7 = 39.5$ |
|  | $r_{12} = 53.325$ |  |  |  |

EXAMPLE 8

|  |  | $d_0 = 1.2278$ |  |  |
|---|---|---|---|---|
| $f_1$ | $r_1 = -167.947$ | $d_1 = 2.5$ | $n_1 = 1.59507$ | $\nu_1 = 35.6$ |
|  | $r_2 = -51.604$ | $d_2 = 0.1$ |  |  |
|  | $r_3 = 97.027$ | $d_3 = 1.0$ | $n_2 = 1.74443$ | $\nu_2 = 49.4$ |
|  | $r_4 = 16.21$ | $d_4 = 1.8$ |  |  |
|  | $r_5 = 23.202$ | $d_5 = 7.9$ | $n_3 = 1.59507$ | $\nu_3 = 35.6$ |
|  | $r_6 = -17.735$ | $d_6 = 1.0$ | $n_4 = 1.79631$ | $\nu_4 = 40.8$ |
|  | $r_7 = 182.618$ | $d_7 = 13.16$ |  |  |
| $f_2$ | $r_8 = 104.359$ | $d_8 = 1.5$ | $n_5 = 1.7335$ | $\nu_5 = 51.0$ |
|  | $r_9 = 34.774$ | $d_9 = 9.2$ | $n_6 = 1.50137$ | $\nu_6 = 56.5$ |
|  | $r_{10} = -22.416$ | $d_{10} = 0.1$ |  |  |
|  | $r_{11} = -160.252$ | $d_{11} = 1.0$ | $n_7 = 1.80454$ | $\nu_7 = 39.5$ |
|  | $r_{12} = 61.571$ |  |  |  |

EXAMPLE 9

|  |  | $d_0 = 1.02869$ |  |  |
|---|---|---|---|---|
| $f_1$ | $r_1 = 37.224$ | $d_1 = 1.0$ | $n_1 = 1.79668$ | $\nu_1 = 45.4$ |
|  | $r_2 = 17.855$ | $d_2 = 1.15$ |  |  |
|  | $r_3 = 31.0$ | $d_3 = 4.8$ | $n_2 = 1.59507$ | $\nu_2 = 35.6$ |
|  | $r_4 = -27.118$ | $d_4 = 1.1$ |  |  |
|  | $r_5 = -26.049$ | $d_5 = 1.0$ | $n_3 = 1.77279$ | $\nu_3 = 49.4$ |
|  | $r_6 = 41.192$ | $d_6 = 1.0$ |  |  |
|  | $r_7 = 45.961$ | $d_7 = 2.6$ | $n_4 = 1.59507$ | $\nu_4 = 35.6$ |
|  | $r_8 = 165.452$ | $d_8 = 13.1$ |  |  |
| $f_2$ | $r_9 = 98.846$ | $d_9 = 1.5$ | $n_5 = 1.79631$ | $\nu_5 = 40.8$ |
|  | $r_{10} = 36.72$ | $d_{10} = 10.0$ | $n_6 = 1.51823$ | $\nu_6 = 59.0$ |
|  | $r_{11} = -23.342$ | $d_{11} = 0.1$ |  |  |
|  | $r_{12} = -91.709$ | $d_{12} = 1.0$ | $n_7 = 1.78797$ | $\nu_7 = 47.5$ |
|  | $r_{13} = 83.740$ |  |  |  |

EXAMPLE 10

|  |  | $d_0 = 3.093$ |  |  |
|---|---|---|---|---|
|  | $r_1 = 24.242$ | $d_1 = 1.0$ | $n_1 = 1.744$ | $\nu_1 = 44.9$ |
|  | $r_2 = 14.539$ | $d_2 = 7.36$ |  |  |
|  | $r_3 = 40.75$ | $d_3 = 2.7$ | $n_2 = 1.59507$ | $\nu_2 = 35.6$ |

-continued $$f_1 \begin{cases} r_4=-73.12 & d_4=1.0 & n_3=1.77279 & \nu_3=49.4 \\ r_5=25.676 & d_5=0.1 \\ r_6=26.376 & d_6=5.1 & n_4=1.59507 & \nu_4=35.6 \\ r_7=129.070 & d_7=6.25 \end{cases}$$

$$f_2 \begin{cases} r_8=116.7 & d_8=1.5 & n_5=1.79631 & \nu_5=40.8 \\ r_9=41.2 & d_9=11.0 & n_6=1.51823 & \nu_6=59.0 \\ r_{10}=-21.21 & d_{10}=0.1 \\ r_{11}=-152.348 & d_{11}=1.0 & n_7=1.78797 & \nu_7=47.5 \\ r_{12}=53.434 \end{cases}$$

EXAMPLE 11

$$d_0=0.6917$$

$$f_1 \begin{cases} r_1=37.545 & d_1=1.0 & n_1=1.79668 & \nu_1=45.4 \\ r_2=17.681 & d_2=1.3 \\ r_3=33.0 & d_3=4.8 & n_2=1.59507 & \nu_2=35.6 \\ r_4=-26.174 & d_4=1.0 \\ r_5=-25.59 & d_5=1.0 & n_3=1.77279 & \nu_3=49.4 \\ r_6=40.631 & d_6=2.75 & n_4=1.59507 & \nu_4=35.6 \\ r_7=136.497 & d_7=14.29 \end{cases}$$

$$f_2 \begin{cases} r_8=100.545 & d_8=1.5 & n_5=1.79631 & \nu_5=40.8 \\ r_9=37.535 & d_9=10.0 & n_6=1.51823 & \nu_6=59.0 \\ r_{10}=-23.269 & d_{10}=0.1 \\ r_{11}=-87.1 & d_{11}=1.0 & n_7=1.78797 & \nu_7=47.5 \\ r_{12}=87.1 \end{cases}$$

EXAMPLE 12

$$d_0=0.9054$$

$$f_1 \begin{cases} r_1=29.797 & d_1=1.0 & n_1=1.79668 & \nu_1=45.4 \\ r_2=17.897 & d_2=1.7 \\ r_3=53.982 & d_3=8.4 & n_2=1.59507 & \nu_2=35.6 \\ r_4=133.503 & d_4=1.0 & n_3=1.77279 & \nu_3=49.4 \\ r_5=14.218 & d_5=5.4 & n_4=1.59507 & \nu_4=35.6 \\ r_6=304.772 & d_6=11.6 \end{cases}$$

$$f_2 \begin{cases} r_7=113.566 & d_7=1.5 & n_5=1.84042 & \nu_5=43.3 \\ r_8=41.622 & d_8=11.1 & n_6=1.56384 & \nu_6=60.8 \\ r_9=-22.559 & d_9=0.1 \\ r_{10}=-160.483 & d_{10}=1.0 & n_7=1.78797 & \nu_7=47.5 \\ r_{11}=48.426 \end{cases}$$

What is claimed is:

1. A rear conversion lens system for mounting on the image side of a photographic lens to make the composite focal length of the rear conversion lens and the photographic lens greater than the focal length of the photographic lens, comprising, in the order from the object side, a diverging group and a converging group, said diverging group consisting of, in the order from the object side, a biconvex positive lens component, a biconcave negative lens component and a positive lens component with its more curved surface facing the object side, said converging group consisting of, in the order from the object side, a positive lens component with its more curved surface facing the image side and a biconcave negative lens component with its more curved surface facing the image side.

2. A rear conversion lens system according to claim 1, wherein said positive lens component in said converging group is a doublet lens component including a negative meniscus lens convex to the object side and a biconvex positive lens.

3. A rear conversion lens system according to claim 1, wherein numerical data are as shown in the following table:

$$d_0=0.7613$$

$$f_1 \begin{cases} r_1=84.84 & d_1=3.0 & n_1=1.59507 & \nu_1=35.6 \\ r_2=-67.022 & d_2=2.3 \\ r_3=-65.251 & d_3=1.0 & n_2=1.74443 & \nu_2=49.4 \\ r_4=16.493 & d_4=1.4 \\ r_5=35.215 & d_5=18.9 & n_3=1.59507 & \nu_3=35.6 \\ r_6=-658.806 & d_6=0.514 \end{cases}$$

$$f_2 \begin{cases} r_7=877.266 & d_7=1.2 & n_4=1.50137 & \nu_4=56.5 \\ r_8=-21.399 & d_8=0.1 \\ r_9=-332.183 & d_9=1.0 & n_5=1.80454 & \nu_5=39.5 \\ r_{10}=47.332 \end{cases}$$

wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

4. A rear conversion lens system according to claim 1, wherein numerical data are as shown in the following table:

$$d_0=1.5423$$

$$f_1 \begin{cases} r_1=179.709 & d_1=3.7 & n_1=1.59507 & \nu_1=35.6 \\ r_2=-90.827 & d_2=2.0 \\ r_3=-109.097 & d_3=2.1 & n_2=1.74443 & \nu_2=49.4 \\ r_4=32.52 & d_4=2.1 \\ r_5=40.56 & d_5=4.2 & n_3=1.59507 & \nu_3=35.6 \\ r_6=99.049 & d_6=66.24 \end{cases}$$

$$f_2 \begin{cases} r_7=317.64 & d_7=6.2 & n_4=1.50137 & \nu_4=56.5 \\ r_8=-55.266 & d_8=0.2 \\ r_9=-195.754 & d_9=1.8 & n_5=1.80454 & \nu_5=39.5 \\ r_{10}=267.716 \end{cases}$$

wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

5. A rear conversion lens system according to claim 2, wherein numerical data are as shown in the following table:

$$d_0=0.52644$$

$$f_1 \begin{cases} r_1=187.587 & d_1=3.0 & n_1=1.59507 & \nu_1=35.6 \\ r_2=-47.144 & d_2=3.3 \\ r_3=-36.794 & d_3=1.0 & n_2=1.74443 & \nu_2=49.4 \\ r_4=19.353 & d_4=2.3 \\ r_5=44.11 & d_5=3.4 & n_3=1.59507 & \nu_3=35.6 \\ r_6=-110.232 & d_6=11.275 \end{cases}$$

$$f_2 \begin{cases} r_7=114.19 & d_7=2.0 & n_4=1.6968 & \nu_4=55.6 \\ r_8=34.505 & d_8=11.1 & n_5=1.50137 & \nu_5=56.5 \\ r_9=-21.903 & d_9=0.1 \\ r_{10}=-92.338 & d_{10}=1.4 & n_6=1.80454 & \nu_6=39.5 \\ r_{11}=80.765 \end{cases}$$

wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

6. A rear conversion lens system for mounting on the image side of a photographic lens to make the composite focal length of the rear conversion lens and the photographic lens greater than the focal length of the photographic lens, comprising, in the order from the object side, a diverging group and a converging group, said diverging group consisting of, in the order from the object side, a positive lens component, a negative lens component with its more curved surface facing the image side, a biconvex positive lens component and a biconcave negative lens component with its more curved surface facing the object side, said converging group consisting of, in the order from the object side, a positive lens component with its more curved surface facing the image side and a biconcave negative lens component with its more curved surface facing the image side.

7. A rear conversion lens system according to claim 6, wherein said positive lens component in said converging group is a doublet lens component including a negative meniscus lens convex to the object side and a biconvex positive lens.

8. A rear conversion lens system according to claim 7, wherein said positive lens component and said negative lens component disposed on the object side of said diverging group are cemented to each other.

9. A rear conversion lens system according to claim 7, wherein said positive lens component foremost in said diverging group is a positive meniscus lens component convex to the image side and said negative lens component with its more curved surface facing the image side is a negative meniscus lens component convex to the object side, and said biconvex positive lens component and said biconcave negative lens component of said diverging group are cemented to each other.

10. A rear conversion lens system according to claim 6, wherein numerical data are as shown in the following table:

|  |  | $d_0 = 0.8448$ |  |  |
|---|---|---|---|---|
| $f_1$ | $r_1 = 7602.182$ | $d_1 = 2.5$ | $n_1 = 1.59507$ | $\nu_1 = 35.6$ |
|  | $r_2 = -85.234$ | $d_2 = 0.1$ |  |  |
|  | $r_3 = 111.37$ | $d_3 = 1.0$ | $n_2 = 1.74443$ | $\nu_2 = 49.4$ |
|  | $r_4 = 16.963$ | $d_4 = 1.0$ |  |  |
|  | $r_5 = 27.323$ | $d_5 = 4.9$ | $n_3 = 1.59507$ | $\nu_3 = 35.6$ |
|  | $r_6 = -27.976$ | $d_6 = 1.1$ |  |  |
|  | $r_7 = -25.116$ | $d_7 = 1.0$ | $n_4 = 1.79668$ | $\nu_4 = 45.4$ |
|  | $r_8 = 439.936$ | $d_8 = 2.645$ |  |  |
| $f_2$ | $r_9 = 1743.856$ | $d_9 = 28.23$ | $n_5 = 1.50137$ | $\nu_5 = 56.5$ |
|  | $r_{10} = -22.944$ | $d_{10} = 0.1$ |  |  |
|  | $r_{11} = -294.545$ | $d_{11} = 1.0$ | $n_6 = 1.80454$ | $\nu_6 = 39.5$ |
|  | $r_{12} = 54.449$ |  |  |  | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

11. A rear conversion lens system according to claim 7, wherein numerical data are as shown in the following table:

|  |  | $d_0 = 1.954$ |  |  |
|---|---|---|---|---|
| $f_1$ | $r_1 = 87.4$ | $d_1 = 2.5$ | $n_1 = 1.59507$ | $\nu_1 = 35.6$ |
|  | $r_2 = -576.216$ | $d_2 = 1.0$ | $n_2 = 1.74443$ | $\nu_2 = 49.4$ |
|  | $r_3 = 17.692$ | $d_3 = 1.4$ |  |  |
|  | $r_4 = 36.939$ | $d_4 = 5.2$ | $n_3 = 1.59507$ | $\nu_3 = 35.6$ |
|  | $r_5 = -20.532$ | $d_5 = 2.0$ |  |  |
|  | $r_6 = -19.333$ | $d_6 = 1.0$ | $n_4 = 1.79877$ | $\nu_4 = 44.3$ |
|  | $r_7 = -79.971$ | $d_7 = 8.469$ |  |  |
| $f_2$ | $r_8 = 86.861$ | $d_8 = 1.5$ | $n_5 = 1.79877$ | $\nu_5 = 44.3$ |
|  | $r_9 = 30.221$ | $d_9 = 13.9$ | $n_6 = 1.50137$ | $\nu_6 = 56.5$ |
|  | $r_{10} = -20.432$ | $d_{10} = 0.1$ |  |  |
|  | $r_{11} = -188.213$ | $d_{11} = 1.0$ | $n_7 = 1.80454$ | $\nu_7 = 39.5$ |
|  | $r_{12} = 53.325$ |  |  |  | wherein r represents the curvature radius of each lens surface, d represent the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

12. A rear conversion lens system according to claim 8, wherein numerical data are as shown in the following table:

|  |  | $d_0 = 1.2278$ |  |  |
|---|---|---|---|---|
| $f_1$ | $r_1 = -167.947$ | $d_1 = 2.5$ | $n_1 = 1.59507$ | $\nu_1 = 35.6$ |
|  | $r_2 = -51.604$ | $d_2 = 0.1$ |  |  |
|  | $r_3 = 97.027$ | $d_3 = 1.0$ | $n_2 = 1.7443$ | $\nu_2 = 49.4$ |
|  | $r_4 = 16.21$ | $d_4 = 1.8$ |  |  |
|  | $r_5 = 23.202$ | $d_5 = 7.9$ | $n_3 = 1.59507$ | $\nu_3 = 35.6$ |
|  | $r_6 = -17.735$ | $d_6 = 1.0$ | $n_4 = 1.79631$ | $\nu_4 = 40.8$ |
|  | $r_7 = 182.618$ | $d_7 = 13.16$ |  |  |
| $f_2$ | $r_8 = 104.359$ | $d_8 = 1.5$ | $n_5 = 1.7335$ | $\nu_5 = 51.0$ |
|  | $r_9 = 34.774$ | $d_9 = 9.2$ | $n_6 = 1.50137$ | $\nu_6 = 56.5$ |
|  | $r_{10} = -22.416$ | $d_{10} = 0.1$ |  |  |
|  | $r_{11} = -160.252$ | $d_{11} = 1.0$ | $n_7 = 1.80454$ | $\nu_7 = 39.5$ |
|  | $r_{12} = 61.571$ |  |  |  | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

13. A rear conversion lens system according to claim 9, wherein numerical data are as shown in the following table:

|  |  | $d_0 = 0.9271$ |  |  |
|---|---|---|---|---|
| $f_1$ | $r_1 = 36.295$ | $d_1 = 1.0$ | $n_1 = 1.79668$ | $\nu_1 = 45.0$ |
|  | $r_2 = 17.706$ | $d_2 = 1.2$ |  |  |
|  | $r_2 = 32.624$ | $d_3 = 4.7$ | $n_2 = 1.59507$ | $\nu_2 = 35.6$ |
|  | $r_4 = -28.183$ | $d_4 = 1.2$ |  |  |
|  | $r_5 = -27.231$ | $d_5 = 1.0$ | $n_3 = 1.77279$ | $\nu_3 = 49.4$ |
|  | $r_6 = 55.411$ | $d_6 = 1.0$ |  |  |
|  | $r_7 = 58.841$ | $d_7 = 1.55$ | $n_4 = 1.59507$ | $\nu_4 = 35.6$ |
|  | $r_8 = 117.020$ | $d_8 = 4.12$ |  |  |

-continued

|  | | | | |
|---|---|---|---|---|
| | $r_9 = 1086.312$ | $d_9 = 25.3$ | $n_5 = 1.50137$ | $v_5 = 56.5$ |
| | $r_{10} = -24.049$ | $d_{10} = 0.1$ | | |
| $f_2$ | $r_{11} = -185.481$ | $d_{11} = 1.0$ | $n_6 = 1.80454$ | $v_6 = 39.5$ |
| | $r_{12} = 65.497$ | | | | wherein r represents the curvature radius of each lens surface, d represents the center thickness of each lens or the air space between adjacent ones of the lenses, excepting $d_0$ which rerepresents the air space between the rear conversion lens and the standard lens, n represents the refractive index of each lens, $v$ represents the Abbe number of each lens, the subscript numbers represent the order from the object side, and $f_1$ and $f_2$ represent the focal lengths of the diverging group and the converging group respectively.

14. A rear conversion lens system for mounting on the image side of a photographic lens to make the composite focal length of the rear conversion lens and the photographic lens greater than the focal length of the photographic lens, comprising, in the order from the object side, a diverging group and a converging group,
said diverging group consisting of, in the order from the object side, a negative meniscus lens component convex to the object side, a biconvex positive lens component, a biconcave negative lens component and a positive meniscus lens component convex to the object side
said converging group consisting of, in the order from the object side, a positive lens component and a biconcave negative lens component.

15. A rear conversion lens system according to claim 14, wherein said positive lens component in said converging group is a doublet lens component including a negative meniscus lens convex to the object side and a biconvex positive lens.

16. A rear conversion lens system according to claim 15, wherein said biconvex positive lens component and said biconcave negative lens component in said diverging group are cemented to each other.

17. A rear conversion lens system according to claim 14, wherein said biconcave negative lens component and said positive meniscus lens component in said diverging group are cemented to each other.

18. A rear conversion lens system according to claim 14, wherein numerical data are as shown in the following table:

|  | | | | |
|---|---|---|---|---|
| | | $d_0 = 0.96135$ | | |
| | $r_1 = \infty$ | $d_1 = 2.5$ | $n_1 = 1.59507$ | $v_1 = 35.6$ |
| | $r_2 = -81.319$ | $d_2 = 0.1$ | | |
| | $r_3 = 401.867$ | $d_3 = 1.0$ | $n_2 = 1.74443$ | $v_2 = 49.4$ |
| $f_1$ | $r_4 = 18.181$ | $d_4 = 1.4$ | | |
| | $r_5 = 28.13$ | $d_5 = 5.3$ | $n_3 = 1.59507$ | $v_3 = 35.6$ |
| | $r_6 = -24.535$ | $d_6 = 1.5$ | | |
| | $r_7 = -21.934$ | $d_7 = 1.0$ | $n_4 = 1.79668$ | $v_4 = 45.4$ |
| | $r_8 = -472.423$ | $d_8 = 11.728$ | | |
| | $r_9 = 88.894$ | $d_9 = 1.5$ | $n_5 = 1.79877$ | $v_5 = 44.3$ |
| | $r_{10} = 33.579$ | $d_{10} = 12.6$ | $n_6 = 1.50137$ | $v_6 = 56.5$ |
| $f_2$ | $r_{11} = -22.556$ | $d_{11} = 0.1$ | | |
| | $r_{12} = -152.552$ | $d_{12} = 1.0$ | $n_7 = 1.80454$ | $v_7 = 39.5$ |
| | $r_{13} = 64.571$ | | | | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $v$ represents the Abbe number of each lens, the subscript numbers represent the order from the object side, and $f_1$ and $f_2$ represent the focal lengths of the diverging group and the converging group respectively.

19. A rear conversion lens system according to claim 15, wherein numerical data are shown in the following table:

|  | | | | |
|---|---|---|---|---|
| | | $d_0 = 1.02869$ | | |
| | $r_1 = 37.224$ | $d_1 = 1.0$ | $n_1 = 1.79668$ | $v_1 = 45.4$ |
| | $r_2 = 17.855$ | $d_2 = 1.15$ | | |
| | $r_3 = 31.0$ | $d_3 = 4.8$ | $n_2 = 1.59507$ | $v_2 = 35.6$ |
| | $r_4 = -27.118$ | $d_4 = 1.1$ | | |
| $f_1$ | $r_5 = -26.049$ | $d_5 = 1.0$ | $n_3 = 1.77279$ | $v_3 = 49.4$ |
| | $r_6 = 41.192$ | $d_6 = 1.0$ | | |
| | $r_7 = 45.961$ | $d_7 = 2.6$ | $n_4 = 1.59507$ | $v_4 = 35.6$ |
| | $r_8 = 165.452$ | $d_8 = 13.1$ | | |
| | $r_9 = 98.846$ | $d_9 = 1.5$ | $n_5 = 1.79631$ | $v_5 = 40.8$ |
| | $r_{10} = 36.72$ | $d_{10} = 10.0$ | $n_6 = 1.51823$ | $v_6 = 59.0$ |
| $f_2$ | $r_{11} = -23.342$ | $d_{11} = 0.1$ | | |
| | $r_{12} = -91.709$ | $d_{12} = 1.0$ | $n_7 = 1.78797$ | $v_7 = 47.5$ |
| | $r_{13} = 83.740$ | | | | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $v$ represents the Abbe number of each lens, the subscript numbers represent the order from the object side, and $f_1$ and $f_2$ represent the focal lengths of the diverging group and the converging group respectively.

20. A rear conversion lens system according to claim 16, wherein numerical data are as shown in the following table:

|  | | | | |
|---|---|---|---|---|
| | | $d_0 = 3.093$ | | |
| | $r_1 = 24.242$ | $d_1 = 1.0$ | $n_1 = 1.744$ | $v_1 = 44.9$ |
| | $r_2 = 14.539$ | $d_2 = 7.36$ | | |
| | $r_3 = 40.75$ | $d_3 = 2.7$ | $n_2 = 1.59507$ | $v_2 = 35.6$ |
| $f_1$ | $r_4 = -73.12$ | $d_4 = 1.0$ | $n_3 = 1.77279$ | $v_3 = 49.4$ |
| | $r_5 = 25.676$ | $d_5 = 0.1$ | | |
| | $r_6 = 26.376$ | $d_6 = 5.1$ | $n_4 = 1.59507$ | $v_4 = 35.6$ |
| | $r_7 = 129.070$ | $d_7 = 6.25$ | | |
| | $r_8 = 116.7$ | $d_8 = 1.5$ | $n_5 = 1.79631$ | $v_5 = 40.8$ |
| | $r_9 = 41.2$ | $d_9 = 11.0$ | $n_6 = 1.51823$ | $v_6 = 59.0$ |
| $f_2$ | $r_{10} = -21.21$ | $d_{10} = 0.1$ | | |
| | $r_{11} = -152.348$ | $d_{11} = 1.0$ | $n_7 = 1.78797$ | $v_7 = 47.5$ |
| | $r_{12} = 53.434$ | | | | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $v$ represents the Abbe number of each lens, the subscript numbers represent the order from the object side, and $f_1$ and $f_2$ represent the focal lengths of the diverging group and the converging group respectively.

21. A rear conversion lens system according to claim 17, wherein numerical data are as shown in the following table:

|  | | | | |
|---|---|---|---|---|
| | | $d_0 = 0.6917$ | | |
| | $r_1 = 37.545$ | $d_1 = 1.0$ | $n_1 = 1.79668$ | $v_1 = 45.4$ |
| | $r_2 = 17.681$ | $d_2 = 1.3$ | | |
| | $r_3 = 33.0$ | $d_3 = 4.8$ | $n_2 = 1.59507$ | $v_2 = 35.6$ |
| $f_1$ | $r_4 = -26.174$ | $d_4 = 1.0$ | | |
| | $r_5 = -25.59$ | $d_5 = 1.0$ | $n_3 = 1.77279$ | $v_3 = 49.4$ |
| | $r_6 = 40.631$ | $d_6 = 2.75$ | $n_4 = 1.59507$ | $v_4 = 35.6$ |
| | $r_7 = 136.497$ | $d_7 = 14.29$ | | |

-continued

| | | | | | |
|---|---|---|---|---|---|
| $f_2$ | $r_8 = 100.545$ | $d_8 = 1.5$ | $n_5 = 1.79631$ | $\nu_5 = 40.8$ | |
| | $r_9 = 37.535$ | $d_9 = 10.0$ | $n_6 = 1.51823$ | $\nu_6 = 59.0$ | |
| | $r_{10} = -23.269$ | $d_{10} = 0.1$ | | | |
| | $r_{11} = -87.1$ | $d_{11} = 1.0$ | $n_7 = 1.78797$ | $\nu_7 = 47.5$ | |
| | $r_{12} = 87.1$ | | | | | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

22. A rear conversion lens system for mounting on the image side of a photographic lens to make the composite focal length of the rear conversion lens and the photographic lens greater than the focal length of the photographic lens, comprising, in the order from the object side, a diverging group and a converging group, said diverging group consisting of, in the order from the object side, a positive meniscus lens component convex to the object side, a positive meniscus lens component convex to the object side, a negative meniscus lens component convex to the object side and a positive lens component with its more curved surface facing the object side, said last three lens components being cemented to each other, said converging group consisting of, in the order from the object side, a positive doublet lens components with its more curved surface facing the image side and a biconcave negative lens component with its more curved surface facing the image side.

23. A rear conversion lens system according to claim 22, wherein numerical data are as shown in the following table:

| | | | | |
|---|---|---|---|---|
| | | $d_0 = 0.9054$ | | |
| $f_1$ | $r_1 = 29.797$ | $d_1 = 1.0$ | $n_1 = 1.79668$ | $\nu_1 = 45.4$ |
| | $r_2 = 17.897$ | $d_2 = 1.7$ | | |
| | $r_3 = 53.982$ | $d_3 = 8.4$ | $n_2 = 1.59507$ | $\nu_2 = 35.6$ |
| | $r_4 = 133.503$ | $d_4 = 1.0$ | $n_3 = 1.77279$ | $\nu_3 = 49.4$ |
| | $r_5 = 14.218$ | $d_5 = 5.4$ | $n_4 = 1.59507$ | $\nu_4 = 35.6$ |
| | $r_6 = 304.772$ | $d_6 = 11.6$ | | |
| $f_2$ | $r_7 = 113.566$ | $d_7 = 1.5$ | $n_5 = 1.84042$ | $\nu_5 = 43.3$ |
| | $r_8 = 41.622$ | $d_8 = 11.1$ | $n_6 = 1.56384$ | $\nu_6 = 60.8$ |
| | $r_9 = -22.559$ | $d_9 = 0.1$ | | |
| | $r_{10} = -160.483$ | $d_{10} = 1.0$ | $n_7 = 1.78797$ | $\nu_7 = 47.5$ |
| | $r_{11} = 48.426$ | | | | wherein r represents the curvature radius of each lens surface, d represents the center thickness of each lens or the air space between adjacent ones of the lenses, excepting $d_0$ which represents the air space between the rear conversion lens and the standard lens, n represents the refractive index of each lens, $\nu$ represents the Abbe number of each lens, the subscript numbers represent the order from the object side, and $f_1$ and $f_2$ represent the focal lengths of the diverging group and the converging group respectively.

* * * * *